United States Patent [19]

Wakata et al.

[11] Patent Number: 4,836,618

[45] Date of Patent: Jun. 6, 1989

[54] BRAKE CONTROL SYSTEM FOR CONTROLLING A BRAKING FORCE TO EACH WHEEL OF A MOTOR VEHICLE

[75] Inventors: Hideo Wakata, Nagoya; Toshihiro Takei, Okazaki; Yoshiyuki Hattori, Toyoake; Haruhiko Uno, Anjo; Yuzo Imoto, Kariya, all of Japan

[73] Assignee: Nippondenso Co., Ltd., Kariya, Japan

[21] Appl. No.: 69,515

[22] Filed: Jul. 2, 1987

[30] Foreign Application Priority Data

Jul. 4, 1986 [JP] Japan ................. 61-158170
Jul. 4, 1986 [JP] Japan ................. 61-158171

[51] Int. Cl.$^4$ .......... B60T 8/66; B60T 8/40; B60T 8/58; B60T 8/62
[52] U.S. Cl. ................. 303/103; 303/93; 303/106; 303/108; 303/111; 303/DIG. 4
[58] Field of Search ........... 303/93, 100, 103, 106, 303/109, 111, DIG. 3, DIG. 4

[56] References Cited

U.S. PATENT DOCUMENTS

| | | | |
|---|---|---|---|
| 3,758,166 | 9/1973 | Kuwana et al. | 303/106 |
| 3,762,775 | 10/1973 | Ochiai | 303/100 X |
| 3,966,264 | 6/1976 | Mattori et al. | 303/100 X |
| 4,042,059 | 8/1977 | Bertolasi | 303/100 X |
| 4,640,557 | 2/1987 | Penizza et al. | 303/100 |
| 4,755,008 | 7/1988 | Imoto et al. | 303/100 X |

FOREIGN PATENT DOCUMENTS

| | | | |
|---|---|---|---|
| 3538809 | 4/1986 | Fed. Rep. of Germany | 303/111 |
| 2309381 | 12/1976 | France | 303/109 |
| 0090754 | 7/1981 | Japan | 303/100 |
| 59-137245 | 8/1984 | Japan | |
| 0001061 | 1/1985 | Japan | 303/100 |
| 61-222849 | 10/1986 | Japan | |

Primary Examiner—Andres Kashnikow
Assistant Examiner—Richard Potasnak
Attorney, Agent, or Firm—Cushman, Darby & Cushman

[57] ABSTRACT

A brake control system for effectively properly performing a braking hydraulic pressure distribution between a front wheel and a rear wheel or a left wheel and a right wheel of a motor vehicle including a master cylinder for generating a hydraulic pressure in response to depression of a brake pedal thereof and applying the hydraulic pressure through first and second braking passages to first and second wheel braking cylinders. This brake control system has first and second pressure control devices respectively coupled to a braking pressure source for allowing the output hydraulic pressures to be regulated independently of each other under control of a control unit. The output of the first pressure control device is coupled through the first braking passage to the first wheel braking cylinder and the output of the second pressure control device is coupled through the second braking passage to the second wheel braking cylinder. The control unit determines first and second target braking pressures to the first and second wheel braking cylinders on the basis of the hydraulic pressure in the master cylinder. The determined first and second target braking pressures are respectively corrected on the basis of the vehicle acceleration and wheel slip ratios.

10 Claims, 10 Drawing Sheets

BRAKE CONTROL SYSTEM FOR CONTROLLING A BRAKING FORCE TO EACH WHEEL OF A MOTOR VEHICLE

BACKGROUND OF THE INVENTION

The present invention relates generally to a brake control system for use in motor vehicles, and more particularly to such a brake control system for suitably controlling the application of a braking force to each of wheels of a motor vehicle.

Brake systems in the vehicle braking art are so constructed that a hydraulic pressure generated through a booster in response to depression of a brake pedal is supplied through a hydraulic pressure passage device to wheel cylinders associated with wheels for the braking operation of the motor vehicle. Japanese Patent Provisional Publication No. 59-137245 discloses such a brake system including a braking control device for appropriately effecting the braking force distribution to the front and rear wheels of the motor vehicle, the braking control device comprising a proportioning valve to perform the pressure-decreasing control for the wheel cylinders associated with the rear wheels. Such a braking control device has disadvantages in that because of fixed boost ratio and braking force distribution, the braking effect does not correspond stably to the depressing force of the brake pedal due to variations of the vehicle loadage and frictional coefficient of the braking pad and the braking forces tend to be unbalanced between the front and rear wheels. In addition, during turning of the vehicle, the loads applied to the left and right wheels are varied, thereby causing an unbalance between the braking forces applied to the left and right wheels. These disadvantates would result in deterioration of the braking feeling.

SUMMARY OF THE INVENTION

The present invention has been developed in order to remove the above-mentioned drawbacks inherent to the conventional braking pressure control systems.

It is therefore an object of the present invention to provide a brake control system for use in motor vehicles which is capable of suitably performing the distribution of braking force to the vehicle wheels in accordance with the vehicle running conditions.

In accordance with the present invention, there is provided a brake control system for effectively properly performing a braking hydraulic pressure distribution between a front wheel and a rear wheel of a motor vehicle including a master cylinder for generating a hydraulic pressure in response to depression of a brake pedal of the motor vehicle and applying the generated hydraulic pressure through first and second braking passages to first and second wheel braking cylinders respectively associated with the front and rear wheels. This brake control system comprises first and second pressure control means respectively coupled to a braking pressure source means for allowing the output hydraulic pressures to be regulated independently of each other in accordance with a control signal from a control means. The output of the first pressure control means is coupled through the first braking passage to said first wheel braking cylinder and the output of the second pressure control means is coupled through the second braking passage to the second wheel braking cylinder. The control mean generates the control signals in accordance with first and second target braking pressures obtained by a target braking pressure setting means so that the hydraulic pressures in the first and second wheel braking cylinders are made respectively equal to the first and second target braking pressures obtained by the target braking pressure setting means, resulting in a proper braking force distribution for the front and rear wheels. The target braking pressure setting means determines the first and second target braking pressures on the basis of the hydraulic pressure in the master cylinder. Preferably, the first and second target braking pressures are respectively corrected in accordance with the acceleration of the motor vehicle and the slip ratios of the front and rear wheels.

In accordance with the present invention, there is also provided a brake control system for, at the time of turning of a motor vehicle, allowing braking pressure distribution between a left wheel and a right wheels of the motor vehicle including a master cylinder for generating a hydraulic pressure in response to depression of a braking pedal of the motor vehicle and applying the generated hydraulic pressure through first and second braking passages to first and second wheel braking cylinders respectively associated with the left and right wheels. This brake control system similarly comprises first and second pressure control means respectively coupled to a braking pressure source means for allowing the output hydraulic pressures to be regulated independently of each other in accordance with a control signal from a control means. The output of the first pressure control means is coupled through the first braking passage to said first wheel braking cylinder and the output of the second pressure control means is coupled through the second braking passage to the second wheel braking cylinder. The control means generates the control signals in accordance with first and second target braking pressures obtained by a target braking pressure setting means so that the hydraulic pressures in the first and second wheel braking cylinders are respectively equal to the first and second target braking pressures obtained by the target braking pressure setting means, that is, the braking hydraulic pressure for the outside wheel with respect to the turning center is higher than the braking pressure for the inside wheel, resulting in a proper braking force distribution for the left and right wheels during the turning of the motor vehicle. The target braking pressure setting means determines the first and second target braking pressures for the left and right wheels on the basis of the hydraulic pressure in the master cylinder. The first and second target braking pressures are corrected in accordance with a braking force movement rate obtained on the basis of the turning state of the motor vehicle in connection with the steering angle of the steering wheel, the vehicle acceleration and vehicle speed. Preferably, the corrected first and second target braking pressures are further corrected on the basis of the slip ratios of the left and right wheels.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
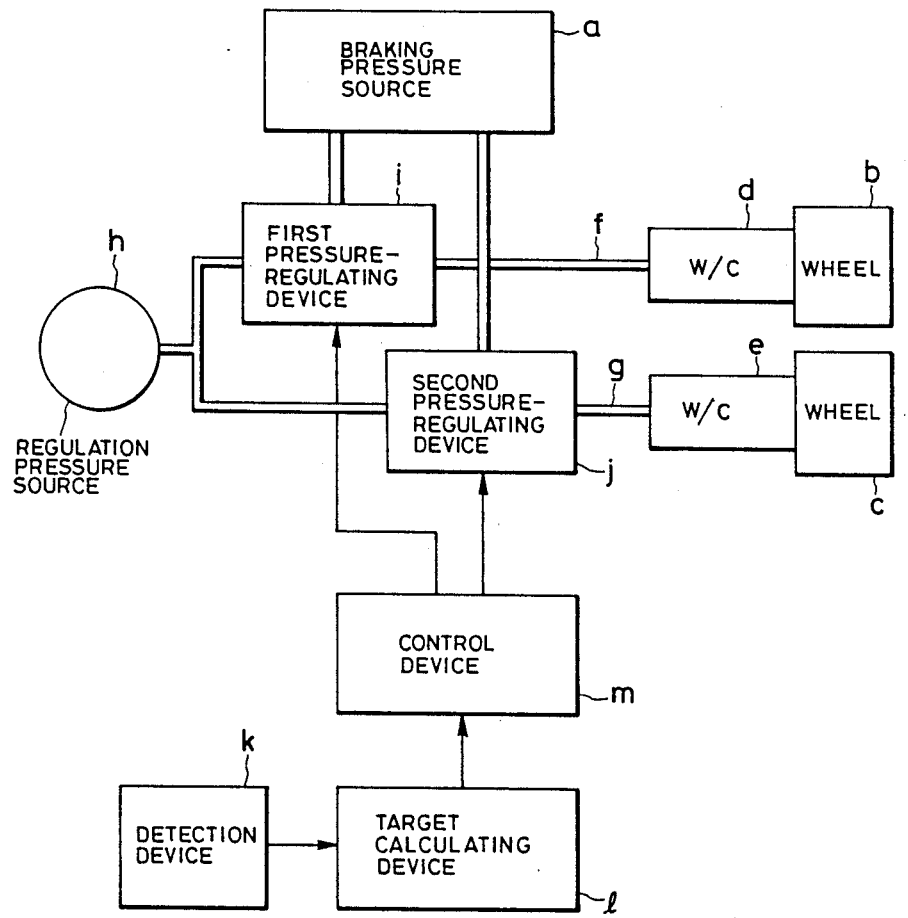
FIG. 1 is a block diagram showing the basic arrangement of a brake control system according to a first embodiment of the present invention.

Prior to making a detailed description of a brake control system according to an embodiment of the present invention, a brief description of the basic arrangement of this embodiment will first be made with reference to FIG. 1 for a better understanding. In FIG. 1, a braking pressure is produced by a braking pressure source a in response to operation of the braking pedal of the motor vehicle and the produced braking pressure is supplied through passages f and g to wheel cylinders d and e so that the braking force is applied to each of wheels b and c. Also included in the brake control system are first and second pressure-regulating devices i and j which are coupled to a regulation pressure source h and the wheel cylinders d and e. A detection device k detects the state variation of each of the wheels b and c and so on and generates a detection signal indicative of the state variation. The detection signal is received by a target caluculating device l for calculating a target braking force value. A control device m is responsive to a signal representative of the calculated target braking force value for generating control signals to the pressure-regulating devices i and j so that the target braking forces are respectively applied to the wheels b and c.

Figure 2:
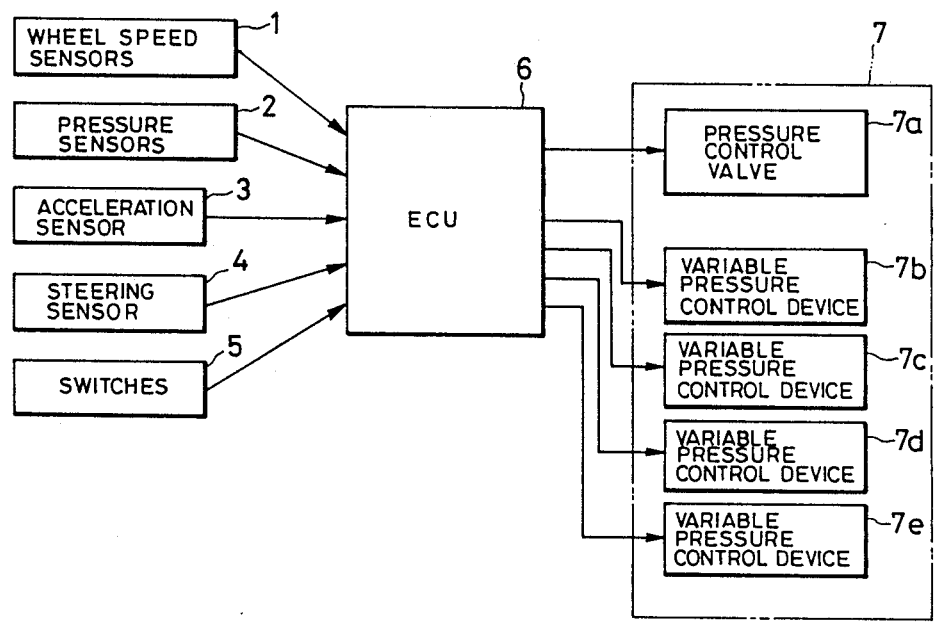
FIG. 2 is a block diagram schematically illustrating the main portions of the present invention.

A description of the embodiment of the invention will hereinbelow made in detail with reference to FIGS. 2 through 6. FIG. 2 is a block diagram illustrating the brake control system according to the embodiment including an electronic control unit 6. To the electronic control unit 6 are coupled a group of wheel speed sensors 1 each being made up of, for example, an electromagnetic pickup device for sensing a speed of each of the wheels of the motor vehicle and a group of hydraulic pressure sensors 2 for detecting the hydraulic pressures of a master cylinder and each of wheels cylinders. Further coupled thereto are an acceleration sensor 3 for detection of acceleration vales in the forward/reverse directions and left/right directions of the motor vehicle, a steering sensor 4 for detecting the steering angle of the steering wheel of the motor vehicle and a group of switches 5 including a brake switch and a pressure switch. The electronic control unit 6 generates control signals on the basis of the wheel speed sensors 1, hydraulic pressure sensors 2, acceleration sensor 3, steering sensor 4 and switches 5, and the generated control signals are supplied to a brake actuator 7 for regulation of hydraulic pressures to the wheel cylinders, the brake actuator 7 including a pressure control valve 7a and variable pressure control devices 7b, 7c, 7d and 7e.

Figure 3:
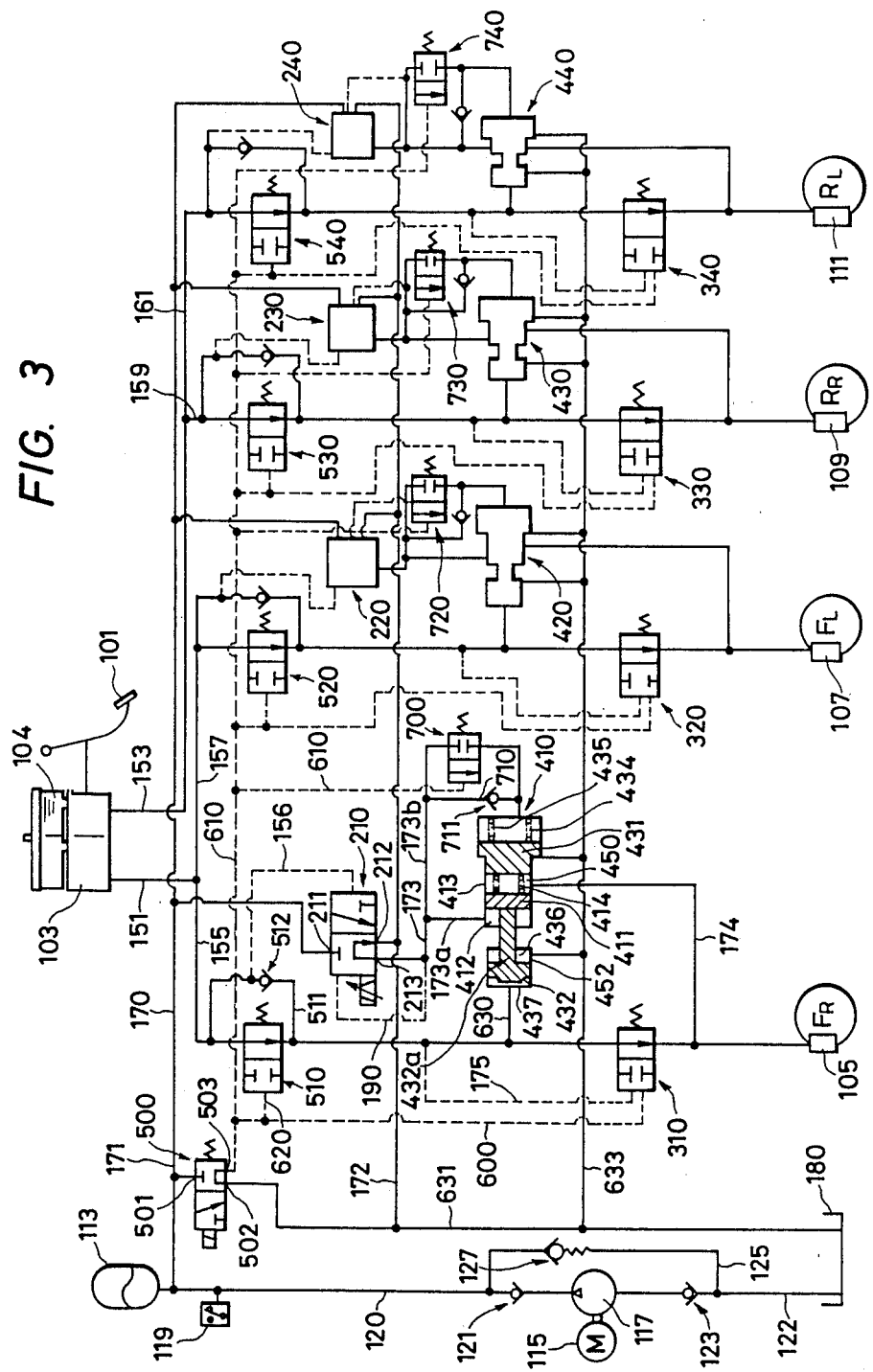
FIG. 3 is an illustration of a braking hydraulic pressure system employed for the present invention.

FIG. 3 shows a hydraulic pressure system of the brake actuator 7 of FIG. 2. In FIG. 2, a brake pedal 101 is coupled to a master cylinder 103 which is in turn connected to a reservoir 104. In response to depression of the brake pedal 101, the master cylinder 103 produces the braking hydraulic pressure corresponding to the depression force of the brake pedal 101. The master cylinder 103 has two hydraulic pressure generating chambers which are respectively connected to first and second main pipes 151 and 153. The first main pipe 151 is branched into first and second branch pipes 155 and 157 and the second main pipe 153 is similarly branched into third and fourth branch pipes 159 and 161. The first branch pipe 155 is connected to a wheel cylinder 105 provided for the front-right wheel of the motor vehicle and the second branch pipe 157 is connected to a wheel cylinder 107 provided for the front-left wheel thereof. Further, the third branch pipe 159 is connected to a wheel cylinder 109 provided for the rear-right wheel and the fourth branch pipe 161 is connected to a wheel cylinder 111 provided for the rear-left wheel. Since the branch pipes and the wheel cylinders are equal in structure to each other, a description will be made only in terms of the first branch pipe 155 and the wheel cylinder 105.

A hydraulic pressure pump 117, being driven by an electric motor illustrated at the reference numeral 115, pumps up oil through a suction pipe 122 from a reservoir 180 and dischrages it to a discharge pipe 120. A check valve 123 is installed in the suction pipe 122 and a further check valve 121 is fitted in the discharge pipe 120. The hydraulic pressure discharged by the hydraulic pressure pump 117 is stored in an accumulator (constant pressure source) 113 through the discharge pipe 120. The accumulator 113 is coupled to a pressure pipe 170 and the pressure stored in the accumulator 113 is introduced through the pressure pipe 170 to a variable pressure control valve device 210. A return pipe 125 is provided for connection between the discharge side and suction side of the hydraulic pressure pump 117 so that the discharge pipe 120 and the suction pipe 122 are coupled to each other. In the return pipe 125 is fitted a safety valve 127 which is set to the opening state when the discharging pressure from the hydraulic pressure pump 117 exceeds a predetermined pressure. The hydraulic pressure over the predetermined pressure is returned through the return pipe 125 to the reservoir 180. In addition, in the discharge pipe 120 is provided a pressure switch 119 so that the pressure stored in the accumulator 113 can be detected. With the pressure in the accumulator 113 becoming below a predetermined pressure value, the hydraulic pressure pump 117 is driven in response to rotation of the electric motor 115. On the other hand, when the pressure in the accumulator 113 exceeds a predetermined pressure value, the electric motor 115 is controlled to be deenergized.

The first branch pipe 155 branched from the first main pipe 151 is coupled through a pressure cut-out valve 510 and a cut-out valve 310 to the wheel cylinder 105. From the pressure pipe 170 is branched a pressure branch pipe 171 which is in turn connected to the first port 501 of a pressure control valve 500. The pressure control valve further has a second port 502 and a third port 503, and comprises an electric switching valve for effecting a switching operation between the first position that the second port 502 is coupled to the third port 503 and the second position that the first port 501 is coupled to the third port 503. The second port 502 is coupled through a return pipe 631 to the reservoir 180. The third port 503 is connected to a pilot pressure pipe 610 from which a pilot pipe 600 is branched. The pilot pipe 600 gives a reference pressure to the pressure cut-out valve 510 through a branch pipe branched therefrom. This reference pressure is also introduced through the pilot pipe 600 into the cut-out valve 310 and through the pilot pressure pipe 610 to a pressure control cut-out valve 700. The upstream side and downstream side of the pressure cut-out valve 510 are coupled to each other through a return pipe 511 and a check valve 512 provided therein.

From the first branch pipe 155 is branched a pilot pipe 175 whereby a reference pressure can be introduced into the cut-out valve 310. When the pressure in the first branch pipe 155 is introduced through the pilot pipe 175 into the cut-out valve 310 or when the pressure in the accumulator 113 is introduced thereinto, the cut-out valve 310 is switched to cut off the passage formed by the first branch pipe 155.

The variable pressure control device 210 has a first port 211, second ports 212 and third port 213. The first port 211 is coupled the pressure pipe 170 and the second port 212 is coupled through a return pipe 172 to the reservoir 180 and the third port 213 is coupled though an input pipe 173 to a modulator 410 which will be described hereinafter. From the input pipe 173 are branched first input pipe 173a and second input pipe 173b. The variable pressure control device 210 can take the first position that the second port 212 is coupled to the third port 213 and the second position that the first port 211 is coupled to the third port 213. The variable pressure control device is the so-called spool type valve wherein a comparison is made between a reference pressure from a pilot pipe 156 branched from the first branch pipe 155 and a reference pressure a second pilot pipe 190 branched from the input pipe 173 an the switching between the first and second positions is made in accordance with the pressure difference. Furthermore, the variable pressure control device 210 can be responsive to an electromagnetic force and the communicating degree between the first port 211 and third port 213 or the communicating degree between the second port 212 and the third port 213 can be controlled to a proper value in accordance with the electromagnetic force.

The modulator 410 has first and second cylinders 450 and 452 therein. In the first cylinder 450 is provided a movable piston 411 and a second pressure regulating piston 431. An input chamber 412 is defined at one end side of the movable piston 411 and an output chamber 413 is defined at the other end side thereof which faces one end side of the second pressure regulating piston 431. At the other end side is defined a first pressure regulating chamber 434. The first input pipe 173a is coupled to the input chamber 412 and an output pipe 174 is coupled to the output chamber 413 and then coupled to the wheel cylinder 105. To the first pressure regulating chamber 434 is coupled the second input pipe 173b in which a pressure regulating cut-out valve 700 is provided. The pressure regulating cut-out valve 700 cuts off the second input pipe 173b in the ordinary state and switches it to the opening state in response to a pilot pressure from the pilot pressure pipe 610. The upstream side and the downstream side of the pressure regulating valve 700 are coupled to each other through a turning pipe 710 which is in turn connected to the second input pipe 173b. In the turning pipe 710 is provided a check valve 711 for allowing only the flow from the variable pressure control device 210 to the first pressure regulating chamber 434.

A first pressure spring 414 is interposed between the movable piston 411 and the second pressure regulating piston 431 and further in the first pressure regulating chamber 434 is provided a second pressure spring 435 for biasing the second pressure regulating piston 431 to the output chamber 413. In the cylinder 452 is provided a first pressure regulating piston 432 and at one end side of the first pressure regulating piston 432 is defined a second pressure regulating chamber 437 to which the pressure in the first branch pipe 155 is introduced through a branch pipe branched 630 therefrom. Furthermore, the third pressure regulating chamber 436 is coupled through a return pipe 633 to the reservoir 180. To the other end of the first pressure regulating piston 432 is attached a rod 432a which extends through the input chamber 412 and then comes into contact with the movable piston 411.

In the second branch pipe 157 are provided a cut-out valve 320, a variable pressure control device 220, a modulator 420, a pressure cut-out valve 520 and pressure regulating cut-out valve 720. Furthermore, in the third branch pipe 159 are provided a cut-out valve 330, a variable pressure control device 230, a modulator 430, a pressure cut-out valve 530 and a pressure regulating cut-out valve 730. Still further, in the fourth branch pipe 161 are provided a cut-out valve 340, a variable pressure control device 240, a modulator 440, a pressure cut-out valve 540 and a pressure regulating cut-out valve 740. A description of these devices will be omitted because these devices are respectively equal in structure to the above-mentioned devices associated with the wheel cylinder 105.

A description will hereinbelow made in terms of the basic operation of the hydraulic pressure system illustrated in FIG. 3. Under the condition of no depression of the brake pedal 101, the pressure control valve 500 is placed in the first position that its second port 502 communicates with its third port 503, and the pressure cut-out valve 510 and the cut-out valve 310 are respectively placed in the opening state. Furthermore, the variable pressure control valve device 210 is placed in the first position as is shown in FIG. 3 and the movable piston 411 of the modulator 410 is kept in the neutral position.

Subsequently, in response to depression of the brake pedal 101 a braking hydraulic pressure is generated in the master cylinder 103 and the generated braking hydraulic pressure is discharged to the first main pipe 151 and the first branch pipe 155. The hydraulic pressure in the first branch pipe 155 is introduced through the pilot pipe 156 into the variable pressure control valve device 210 as a pilot hydraulic pressure. The variable pressure control valve device 210 is responsive to the pilot hydraulic pressure so that it is switched from the first position that the second port 212 communicates with the third port 213 to the second position that the first port 211 communicates with the third port 213. In response to the switching operation, a constant hydraulic pressure introduced through the pressure pipe 170 from the accumulator 113 advances from the first port 211 to the third port 213 and further advances from the input pipe 173 through the first output pipe 173a into the input chamber 412 of the modulator 410. As a result, the movable piston 411 is responsive to the pressure in the input chamber 412 so that it is moved toward the output chamber 413. This movement of the movable piston 411 causes decrease of the volume of the output chamber 413 and hence increase of the pressure in the output chamber 413. The increased pressure is transferred through the output pipe 174 to the wheel cylinder 105. At this time, since the pressure regulating cut-out valve 700 is cutting off the second output pipe 173b and the check valve 711 is preventing the flowing-out from the first pressure regulating chamber 435, the pressure in the first pressure regulating chamber 434 is kept constant whereby the position of the second pressure regulating piston 431 is fixed as it is. Furthermore, the hydraulic pressure flowing in the first branch pipe 151 is also introduced through the branch pipe 630 to the second pressure regulating chamber 437 whereby the first pressure regulating piston 432 biases the movable piston 411 toward the output chamber 413 by means of the rod 432a. The cut-out valve 310 receives, as a refernce pressure, the hydraulic pressure flowing in the first branch pipe 155 through the pilot pipe 175 and therefore the cut-out valve 310 cuts off the first branch pipe 155 in response to introduction of the pressure into the first branch pipe 155.

The variable pressure control valve device 210 is responsive to a reference pressure from the pilot pipe 156 and a reference pressure from the pilot pipe 190. That is, the variable pressure control valve device 210 is switched by the pressure difference between the hydraulic pressure in the first branch pipe 155 and the hydraulic pressure in the input pipe 173. In the variable pressure control device 210, the surface for receiving the pressure from the pilot pipe 156 is greater in area that the surface for receiving the pressure from the second pilot pipe 190. Here, assuming that the ratio of the pressure-receiving areas is $\alpha$, when the pressure from the second pilot pipe 190 is $\alpha$ times of the pressure from the pilot pipe 156, the variable pressure control device 210 is switched from the second position to the first position so that the input pipe 173 is coupled to the return pipe 172. In other words, the hydraulic pressure passing through the input pipe 173 is $\alpha$ times of the hydraulic pressure passing through the first branch pipe 155.

When the hydraulic pressure passing through the input pipe 173 exceeds $\alpha$ times of the pressure passing through the first branch pipe 155, as described above, the variable pressure control valve device 210 is switched to the first position shown in FIG. 3 and the pilot pipe 175 is coupled through the third port 213 and second port 212 to the return pipe 172, and therefore, the hydraulic pressure in the input chamber 412 is returned through the input pipe 173 and the return pipe 172 to the reservoir 180. As a result, the hydraulic pressure passing through the input pipe 173, i.e., the pressure intrduced into the input chamber 412, is always kept to $\alpha$ times of the pressure passing through the first branch pipe 155.

In the modulator 410, since the pressure-receiving area of the first pressure regulating piston 432 which faces the second pressure regulating chamber 437 are arranged to be equal to the pressure-receiving area of the movable piston 411 and the force of the spring 414 is set to be relatively small, the pressure generated in the output chamber 413 is substantially equal to the sum of the pressure in the pipe 155 due to the master cylinder 103 and the pressure in the pipe 173. Therefore, the pressure in the wheel cylinder 105 is $(\alpha+1)$ times of the pressure from the master cylinder 103, resulting in the magnification effect.

The value of $\alpha$ can be changed in accordance with energization of the variable pressure control device 210. That is, in FIG. 3, when a current is supplied thereto to be forced in the right direction, the variable pressure control device 210 is set to the pressure-decreasing state and the pressure in the input pipe 173 is set to be low thereby making the value of $\alpha$ smaller. On the other hand, when a current is supplied thereto to be forced in the leftward direction, the variable pressure control device 210 is set to the pressure-increasing state and the pressure in the input pipe 173 is increased thereby making larger the value of $\alpha$. Thus, with the current supplied to the variable pressure control device 210 being controlled by the electronic control unit (ECU) 6, the value of $\alpha$ can be controlled, thereby causing a variable magnification control. The ECU 6 controls the variable pressure control devices 210 to 240 in accordance with the signals from the sensors 1 to 5 in FIG. 2 so as to provide a proper braking force distribution. This will hereinafter described in detail.

The system according to this embodiment includes an anti-skid control function for preventing the locking of the wheel caused by the rapidly braking operation and a traction function for preventing the spin of the driven wheel resulting from the start or acceleration of the motor vehicle. First, a description is made in the case that the motor vehicle is rapidly stopped in response to the rapid depression of the brake pedal 101 by a vehicle driver. The ECU 6 determines the condition of the wheel locking in accordance with the signal from each of the wheel speed sensors 1. Upon the determination, the ECU 6 generates a switching signal to the pressure control valve 500 which is in turn switched to the second position so that the first port 501 is coupled to the third port 503. Therefore, the pressure stored in the accumulator 113 is supplied through the pressure pipe 170, pressure branch pipe 171, first port 501 and third port 503 into the pilot pressure pipe 610 and the pilot pipe 600. The pressure supplied to the pilot pipe 600 is supplied through the pilot pipe 620 to the pressure cut-out valve 510 which is in turn set to the closed state. In addition, the pressure supplied to the pilot pipe 600 is also supplied to the cut-out valve 310 which is in turn set to the closed state. On the other hand, the pressure supplied to the pilot pressure pipe 610 is applied to the pressure regulating cut-out valve 700 so that the second input pipe 173a is set to the communicating state. The ECU 6 further generates a switching signal to the variable pressure control device 210 so that the variable pressure control device 210 is switched to the first position. As a result, the third port 213 of the variable pressure control device 210 is coupled to the second port 212 thereof and the pressures in the input chamber 412 and the first pressure regulating chamber 434 are respectively discharged through the first input pipe 173a second input pipe 173b and the return pipes 172, 631 into the reservoir 180. The movable piston 411 is moved toward the input chamber 412 and hence the second pressure regulating piston 431 is moved toward the first pressure regulating chamber 434 whereby the volume of the output chamber 413 is increased and the pressure in the wheel cyliner 105 is returned through the output pipe 174 to the output chamber 413. Therefore, the pressure in the wheel cylinder for the locked wheel is decreased, resulting in releasing the wheel from the locking state.

On the other hand, when the spin of the wheel has occurred on the rapid vehicle start and the like, the engine torque is decreased and the high pressure is introduced from the accumulator 113 and hydraulic pressure pump 117 to the hydraulic pressure systems for the driven wheels so that the braking forces to the driven wheels are regulated as well as in the above-description whereby the motor vehicle can be smoothly started with the prevention of the slippage of the driven wheels.

The braking force distribution control performed by the ECU 6 will be described hereinbelow.

Figure 4:
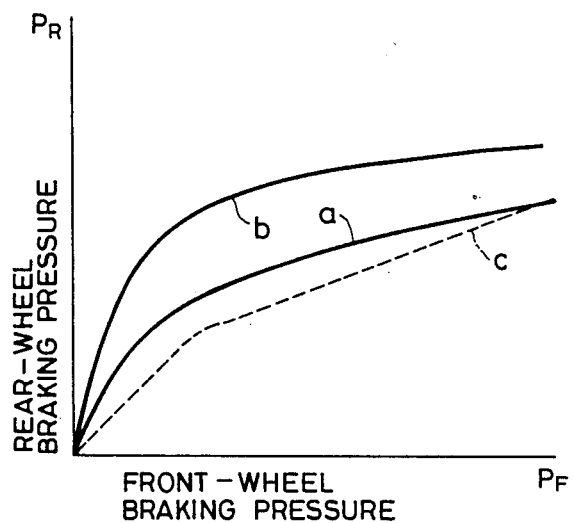
FIG. 4 is a graphic diagram showing the ideal rear-wheel braking hydraulic pressures with respect to the front-wheel braking hydraulic pressures.
Figure 5:
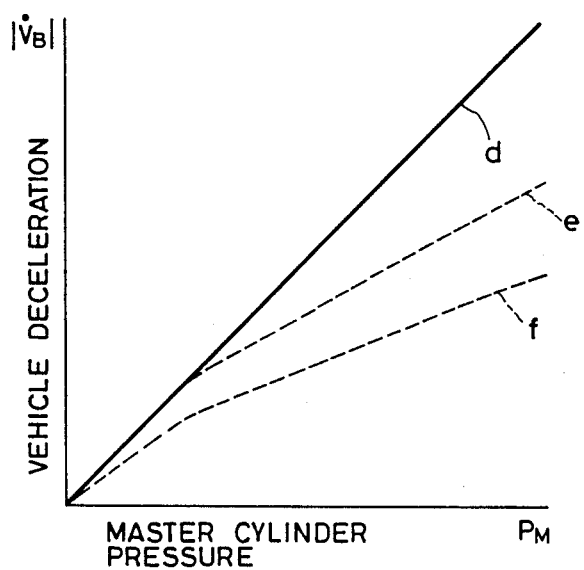
FIG. 5 is a graphic diagram showing the relationship between the hydraulic pressure in the master cylinder and the deceleration of the motor vehicle.

FIG. 4 shows ideal braking force distributions for the front and rear wheels. In FIG. 4, a curve a represents an ideal distribution in the case that a motor vehicle is in the empty state and a curve b represents an ideal distribution in the case that the motor vehicle is in the loading state. A curve c designates the distribution characteristic of a conventional system including a proportioning valve. It will be understood from FIG. 4 that the distribution characteristic of the conventional system is significantly different from either of the ideal distribution characteristics. FIG. 5 illustrates the relationship between the hydraulic pressure in the master cylinder and the deceleration of the motor vehicle. In FIG. 5, a curve d represents an ideal characteristic, a curve e represents the characteristic of the conventional system in the case that the motor vehicle is in the empty state, and a curve f designates the characteristic of the conventional system in the case that the motor vehicle is in the loading state. It will be also understood from FIG. 5 that the characteristics of the conventional system are respectively separated from the ideal characteristic indicated by the curve d. For improving the performance of the braking force distribution control system, it is required that the characteristics thereof are brought near the ideal characteristics indicated by the curves a, b and d.

The ideal characteristic curves a and b in FIG. 4 can be obtained in accordance with the following equations (1) and (2).

$$P_F = K_F \times \{W_F \times |\dot{V}_B| + (h/l) \times w \times |\dot{V}_B|^2\} \quad (1)$$

$$P_R = K_R \times \{W_R \times |\dot{V}_B| - (h/l) \times w \times |\dot{V}_B|^2\} \quad (2)$$

where:
$P_F$=a braking hydraulic pressure for the front wheel;
$P_R$=a braking hydraulic pressure for the rear wheel;
$W_F$=a load applied to the front wheel when the motor vehicle is stopped;
$W_R$=a load applied to the rear wheel when the motor vehicle is stopped;
h=the height of the center of gravity of the motor vehicle;
l=the length of the wheel base;
$\dot{V}_B$=deceleration of the motor vehicle;
$K_F$, $K_R$=constants determined in accordance with the diameter of the disc rotor braking factors such as the frictional coefficient of the braking pad, the radius of the wheel and so on;
w=the weight of the motor vehicle.

For satisfying the characteristic indicated by the curve d in FIG. 5, the target vehicle deceleration $|\dot{V}_B^*|$ is determined in accordance with an equation (3), i.e. $|\dot{V}_B^*| = 1/k \times P_m$ where k is a constant and $P_M$ is the hydraulic pressure in the master cylinder, and therefore, the hydraulic pressures $P_F$ and $P_R$ for the front and rear wheels can be rewritten as the following equations (4) and (5).

$$P_F = C_{F1} \times P_M + C_{F2} \times P_M^2 \quad (4)$$

$$P_R = C_{R1} \times P_M - C_{R2} \times P_M^2 \quad (5)$$

where $C_{F1}$, $C_{F2}$, $C_{R1}$, $C_{R2}$ are values determined in accordance with the above-mentioned $K_F$, $K_R$, h, l, k, $W_F$, $W_R$, w, the values being varied in accordance with the kind of the motor vehicle and so on.

For example, $P_F$ and $P_R$ are determined as follows.

$$P_F = 4.83 P_M + 0.0984 P_M^2 \quad (6)$$

$$P_R = 5.75 P_M - 0.148 P_M^2 \quad (7)$$

The above-mentioned equations (4) and (5) provide the ideal characteristics under the condition that the weight of the vehicle, the frictional coefficient of the braking pad and so on are constant, that is, in the case that the condition is not varied, and they do not necessarily provide the ideal characteristics under the variations of the condition. That is, in the basic condition that $P_F$ and $P_R$ have been obtained previously, the vehicle deceleration $|\dot{V}_B|$ $(= -\dot{V}_B)$ is coincident with the target vehicle deceleration $-\dot{V}_B^*$ obtained as a function of the hydraulic pressure $P_M$ in the master cylinder in accordance with the equation (3). Otherwise, they are not coincident with each other, i.e., $\dot{V}_B \neq \dot{V}_B^*$. Thus, for elimination of the difference $\dot{V}_B - \dot{V}_B^*$, is required to correct the master cylinder hydraulic pressure $P_M$ in the equation (3). That is, the master cylinder hydraulic pressure $P_M$ is corrected in accordance with the following equation (8) and, in the equations (4) and (5), the obtained correction value $P_M^*$ is used instead of $P_M$.

$$P_M^* = P_M \times \frac{|\dot{V}_B^*|}{|\dot{V}_B|} = \frac{P_M^2}{k \times |\dot{V}_B|} \quad (8)$$

Therefore, the target front wheel braking hydraulic pressure $P_F^*$ and the target rear wheel braking hydraulic pressure $P_R^*$ can be obtained as follows.

$$P_F^* = C_{F1} \times P_M^* + C_{F2} \times P_M^{*2} \quad (9)$$

$$P_R^* = C_{R1} \times P_M^* - C_{R2} \times P_M^{*2} \quad (10)$$

According to the above-mentioned processes, although the vehicle deceleration assumes the ideal value in the case that the wheel is not in the locking state, it is required for achieving the ideal braking force distribution for the wheels that the braking hydraulic pressure for each of the wheels is further corrected so that the slip ratios of the wheels are equal to each other or the slip ratio of the rear wheels is smaller than the slip ratio of the front wheels in terms of stability of the motor vehicle. When the slip ratio is too great, the correction is made so that the hydraulic pressure is decreased. When the slip ratio is too small, the correction is made so that the hydraulic pressure is increased.

Figure 6:
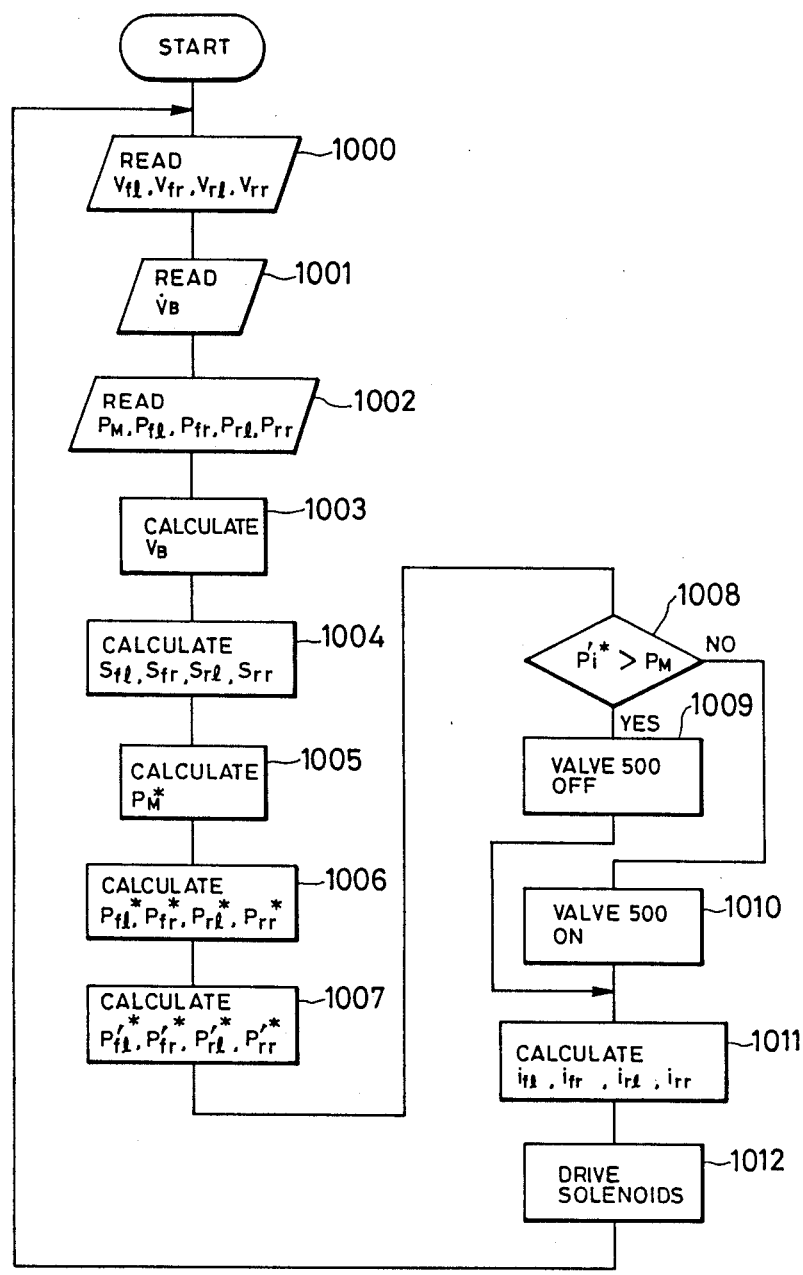
FIG. 6 is a flow chart showing the programmed steps of the electronic control unit of the brake control system according to the first embodiment.

The above-described processes are executed by the ECU 6 in accordance with a flow chart shown in FIG. 6. This routine starts with a step 1000 in which the ECU reads from the wheel speed sensors 1 signals indicative of the wheel speed Vfl of the front-left wheel FL, the wheel speed Vfr of the front-right wheel FR, the wheel speed Vrl of the rear-left wheel RL and the wheel speed Vrr of the rear-right wheel RR. Subsequently, a step 1001 is executed to read the vehicle acceleration $\dot{V}_B$ from the acceleration sensor 3 and a step 1002 is executed to receive the hydraulic pressure $P_M$ in the master cylinder and the hydraulic pressures Pfl, Pfr, Prl, Prr in the wheel cylinders. In a subsequent step 1003, a vehicle speed $V_B$ is calculated on the basis of the respective wheel speeds Vfl, Vfr, Vrl, Vrr read in the previous step 1000 and the vehicle acceleration $\dot{V}_B$ read in the previous step 1001. The step 1003 is followed by a step 1004 in which slip ratios are obtained from the respective wheel speeds Vfl, Vfr, Vrl, Vrr read in the step 1000 and the vehicle speed $V_B$ calculated in the step 1003. For example, the slip ratio Sfl of the front-left wheel FL is obtained as $Sfl=(V_B-Vfl)/V_B$. In a step 1005, the correction master cylinder hydraulic pressure $P_M^*$ is derived as a function of the hydraulic pressure $P_M$ in the master cylinder and the vehicle acceleration $\dot{V}_B$ in accordance with the above-mentioned equation (8). Furthermore, in a step 1006, the front wheel target braking hydraulic pressures Pfl and Pfr is calculated in accordance with the equation (9) and the rear wheel target hydraulic pressures Prl* and Prr* in accordance with the equation (10). In a subsequent step 1007, each of the target braking hydraulic pressures obtained in the step 1006 is corrected in accordance with the magnitude of each of the slip ratios Sfl, Sfr, Srl, Srr obtained in the step 1004 so as to obtain correction braking hydraulic pressures P'fl*, P'fr*, P'rl*, P'rr*.

Thereafter, control goes to a step 1008 in which the respective correction braking hydraulic pressures P'i* (=P'fl*, P'fr*, P'rl*, P'rr*) are respectively compared with the hydraulic pressure $P_M$ in the master cylinder. If geater than $P_M$, the pressure control valve 500 is turned off in a step 1009. Otherwise, the pressure control valve 500 is turned on in a step 1010. In a step 1011, supply currents ifl, ifr, irl, irr to the solenoids of the variable pressure control devices 210, 220, 230, 240 are respectively calculated on the basis of the differences between the wheel braking hydraulic pressures read in the step 1002 and the correction braking hydraulic pressures obtained in the step 1007. The calculated supply currents are supplied to the respective solenoids of the variable pressure control devices 210, 220, 230, 240.

In this embodiment, since the hydraulic pressure control is performed independently for each of the wheels, stable braking operation can always be achieved irrespective of the load variations in the motor vehicle and the variation of the frictional coefficient of the braking pad.

A description of braking force distribution control according to a second embodiment of the present invention will be made hereinbelow.

Figure 7:
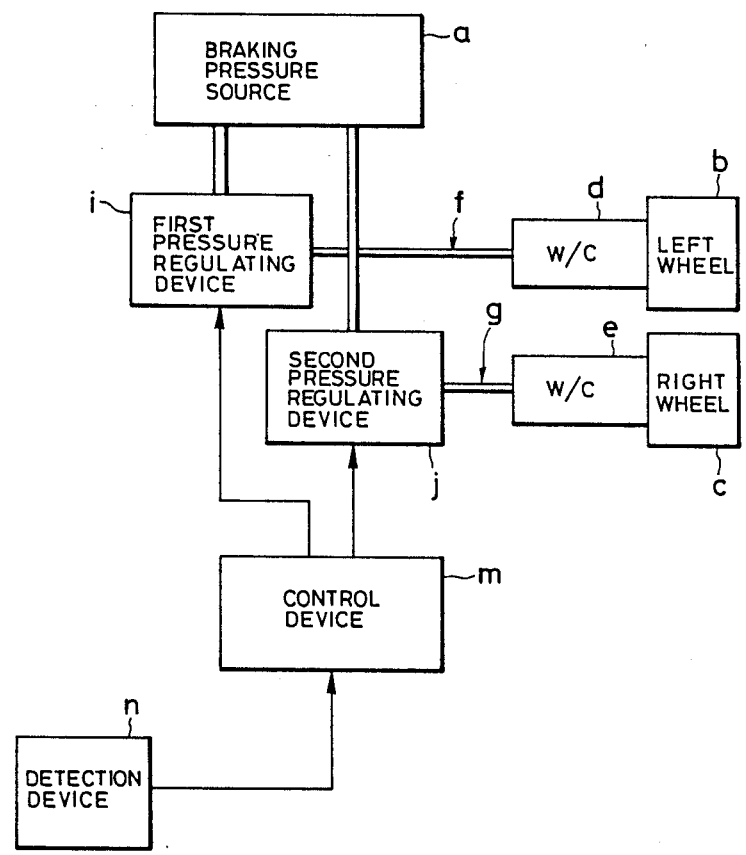
FIG. 7 is a block diagram basically showing the arrangement of a brake control system according to a second embodiment of the present invention.

First, a brief description of the basic arrangement of the second embodiment will be made with reference to FIG. 7 for a better understanding. In FIG. 7, a braking pressure is produced by a braking pressure source a in response to operation of the braking pedal of a motor vehicle and the produced braking pressure is supplied through passages f and g to a wheel cylinder d associated with the left wheel b and a wheel cylinder e associated with the right wheel c. Also included in the braking pressure control system according to the second embodiment are first and second pressure regulating devices i and j which are respectively coupled to the wheel cylinders d and e so that the braking pressures in the wheel cylinders d and e are controlled independently from each other. A detection device n detects the turning state of the motor vehicle and generates a detection signal indicative of the turning state. The detection device n is connected to a control device m which in turn generates control signals to the first and second pressure regulating devices i and j whereby the distribution of the braking pressure for the left wheel b and the right wheel c are determined in accordance with the control signals so that the braking pressure for the outside wheel is greater than the braking pressure for the inside wheel.

At the time of the turning of a motor vehicle, the motor vehicle is accelerated in a direction normal to the forward direction of the motor vehicle due to a centrifugal force and the load is transferred from the inside wheel side to the outside wheel side with respect to the turning center, that is, a greater load is applied to the outside wheels and hence there is the difference in load between the right wheels and left wheels. Furthermore, since the motor vehicle is decelerated in response to the vehicle braking operation at the time, the load is transferred from the rear wheel side t the front wheel side. As a result, the loads applied to the wheels are considerably different from each other as compared with in the case that the motor vehicle is stopped. Thus, it is required at the time of the turning that the braking forces of the inside wheels are decreased and the braking force of the outside wheels are increased in accordance with the turning state of the motor vehicle in order to increase the limit of locking of the wheel and to improve the braking effect of the motor vehicle.

The braking force distribution control according t the second embodiment will hereinbelow described with reference to FIG. 8A and 8B.

Program execution begins with a step 2000 in which the ECU reads from the wheel speed sensors 1 signals indicative of the wheel speed Vfl of the front-left wheel FL, the wheel speed Vfr of the front-right wheel FR, the wheel speed Vrl of the rear-left wheel RL and the wheel speed Vrr of the rear-right wheel RR. Subsequently, a step 2001 is executed to read the vehicle acceleration in the forward direction of the motor vehicle and the vehicle acceleration in a direction normal to the vehicle forward direction. Control goes to a step 2002 to read the master cylinder hydraulic pressure $P_M$ and the wheel cylinder hydraulic pressures Pfl, Pfr, Prl, Prr, and further goes to a step 2003 to read the steering angle δ from the steering sensor 4. In a subsequent step 2004, a vehicle speed $V_B$ is calculated on the basis of the respective wheel speeds Vfl, Vfr, Vrl, Vrr read in the step 2000 and the vehicle acceleration x in the vehicle forward direction. In a subsequent step 2005, slip ratios S is obtained on the basis of the respective wheel speeds in the step 2000 and the vehicle speed $V_B$ in the step 2004. For example, the slip ratio Sfl of the front-left wheel FL is obtained as $Sfl=(V_B-Vfl)/V_B$. Control advances to a step 2006 in which the target braking hydraulic pressures Pfl\*, Pfr\*, Prl\*,Prr\* are obtained in accordance with the following equations (11) and (12).

$$Pfl^* = Pfr^* = C_{F1} \times P_M + C_{F2} \times P_M^2 \quad (11)$$

$$Prl^* = Prr^* = C_{R1} \times P_M - C_{R2} \times P_M^2 \quad (12)$$

where $C_{F1}$, $C_{F2}$, $C_{R1}$, $C_{R2}$ are constant which are respectively obtained in accordance with factors relating to the vehicle and braking.

Thereafter, a correction of the braking pressure distribution for the right and left wheels is made in a step 2007. Assuming that the motor vehicle is being turned in the left direction, it is required that the braking hydraulic pressures for the front-left and rear-left wheels, i.e., inside wheels, are decreased and the braking hydraulic pressures for the front-right and rear right wheels, i.e., outside wheels, are increased. The respective target wheel braking pressures are calculated in accordance with the following equations (13) through (16).

$$P'fl^* = Pfl^* \times (1-\alpha_F) \quad (13)$$

$$i \; P'rl^* = Prl^* \times (1-\alpha_R) \quad (14)$$

$$P'fr^* = Pfr^* \times (1-\alpha_F) \quad (14)$$

$$P'rr^* = Prr^* \times (1+\alpha_R) \quad (16)$$

In the above equations (13) to (16), $\alpha_F$, $\alpha_R$ are moving rates of the braking force between the left and right wheels which are obtained on the basis of the steering angle $\delta$, the vehicle acceleration in a direction normal to the vehicle forward direction and the vehicle speed $V_B$. $\alpha_F$ is the braking force moving rate for the front wheels and $\alpha_R$ is the braking force moving rate for the rear wheels. More specifically, the present turning state of the motor vehicle is obtained on the basis of the steering angle $\delta$, the vehicle acceleration and the vehicle speed $V_B$, and the load moving rates $\beta_F$ and $\beta_R$ between the left and right wheels is obtained on the basis of the obtained vehicle turning state, and then the braking force moving ratios $\alpha_F$ and $\alpha_R$ is obtained on the basis of the load moving ratios in accordance with the following equations (17) and (18).

$$\alpha_F = \gamma_F \times \beta_F \quad (17)$$

$$\alpha_R = \gamma_R \times \beta_R \quad (18)$$

In the above equations (17) and (18), $\gamma_F$ and $\gamma_R$ are ratios indicative of the degree of the braking force movement with respect to the load movement. $\gamma_F = \gamma_R = 0$ represents the state that the braking force mevement is not effected between the left and right wheels, and $\gamma_F = \gamma_R = 1$ represents the state that the braking force distribution is made in accordance with the loads of the respective wheels, that is, $\alpha_F$ and $\alpha_R$ are respectively set to be equal to the actual load movements. It is preferable that $\gamma_F$ and $\gamma_R$ are set to assume proper values. If the values of $\gamma_F$ and $\gamma_R$ are great, although the wheel lock limit is improved and the brake distance is shortened, the yaw moment in the direction opposite to the turning direction is increased because of increase of the braking force for the outside wheels. Actually, $\gamma_F$ and $\gamma_R$ are respectively obtained as a function of $V_B$ using a map shown in FIG. 9. As understood from FIG. 9, $\gamma_F$ and $\gamma_R$ are set to small values during low-speed travelling in view of improvement of the turning performance and are set to large values during high-speed travelling in view of stability and safe. FIG. 8B is a flow chart showing the detail of the operation executed in the step 2007.

In a subsequent step 2008, each of the target braking hydraulic pressures obtained in the step 2007 are corrected in accordance with the magnitude of the slip ratio of each of the wheels so as to obtain correction target braking hydraulic pressures Pfl\*\*, Prl\*\*, Prr\*\*. That is, since the braking state is actually varied due to the variations of the vehicle weight and the brake pad frictional coefficient, the braking force distribution for the wheels is controlled so that, when the slip ratio is too great, the hydraulic pressure is decreased and, when the slip ratio is too small, the hydraulic pressure is increased. However, in the case that the frictional coefficient of the road surface relative the right wheel is different from that of the road surface relative to the left wheel, the above-mentioned correction in connection with the slip ratio is not effected, because the braking forces for the left and right wheels are different from each other due to the difference between the frictional coefficients and it is difficult to effect the straight travelling of the motor vehicle due to generation of a yaw moment. Therefore, when the steering angle $\delta$ is close to zero, the correction effected in connection with the slip ratio is inhibited.

In a step 2009, the correction target braking hydraulic pressures Pi\*\* (=Pfl\*\*, Prl\*\*, Pfr\*\*, Prr\*\*) (or the target braking hydraulic pressures) are respectively compared with the hydraulic pressure $P_M$ in the master cylinder. If greater, the pressure control valve 500 is turned off in a step 2010. On the other hand, if smaller, the pressure control valve 500 is turned on in a step 2011. Subsequently, in a step 2012, supply currents ifl, ifr, irl, irr to the solenoids of the variable pressure control devices 210, 220, 230, 240 are respectively on the basis of the differences between the respective wheel braking pressures in the step 2002 and the correction braking pressure in the step 2008, followed by a step 2013 to supply the currents ifl, ifr, irl, irr to the corresponding solenoids.

Figure 10:
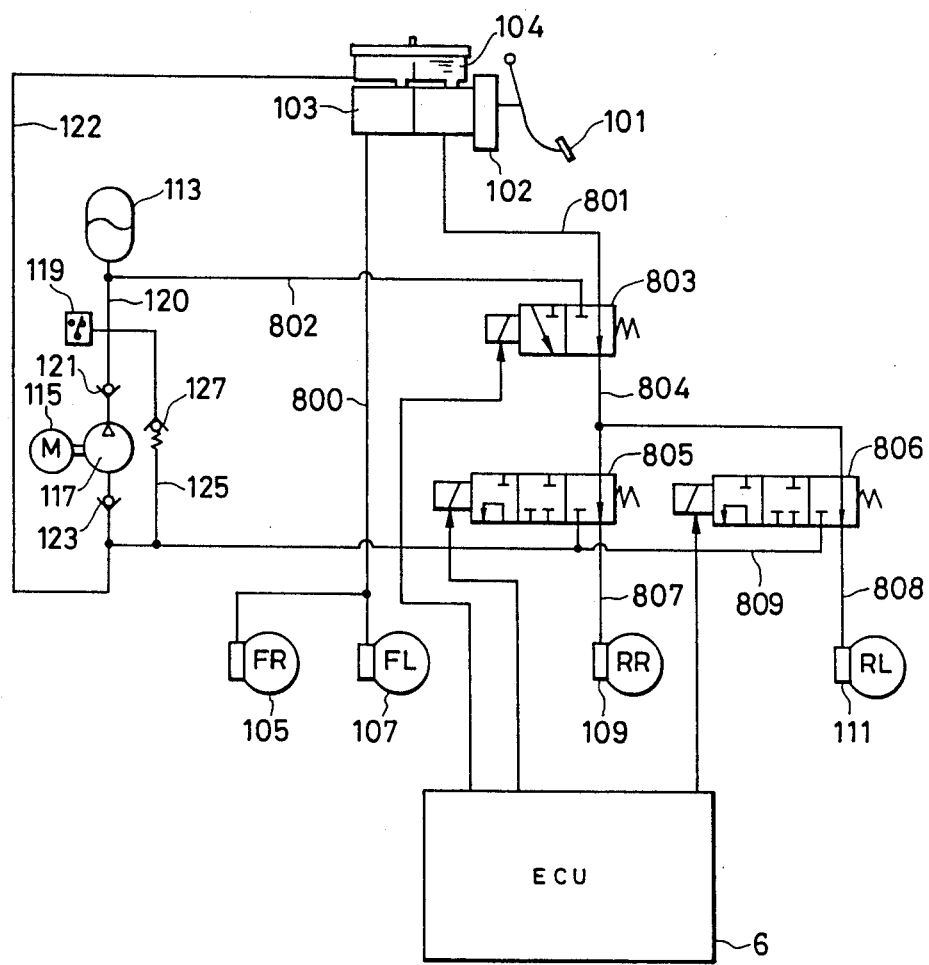
FIG. 10 is a schematic diagram showing a brake control system according to a third embodiment of the present invention.

FIG. 10 is a diagram schematically showing a braking control system according to a third embodiment of the present invention. In this embodiment, a braking force distribution is made only for the rear-left and rear-right wheels. Parts corresponding to those in the above-mentioned embodiments are marked with the same numerals and the description thereof are omitted for brevity.

In FIG. 10, a master cylinder 103 generates a braking hydraulic pressure in response to the depression of a brake pedal 101. The depression force to the brake pedal 101 is transferred to the master cylinder 103 through a negative pressure booster 102 for increasing the force produced by the depression of the brake pedal 101. The hydraulic pressure produced in the master cylinder 103 is supplied through a first main pipe 800 to wheel cylinders 105 and 107. The reference numeral 801 is a second main pipe for introducing the hydraulic pressure in the master cylinder 103 into wheel cylinders 109 and 111 associated with the rear wheels of the motor vehicle. The second main pipe 801 is coupled to a three-port and two piston valve 803 which is also connected to a pressure pipe 802 the other end of which is coupled to an accumulator 113 for supplying high pressure liquid. The three-port and two position valve 803 is a solenoid-operated valve by which the second main pipe 801 is coupled to an introduction pipe 804 at the time of no current supply (OFF) and the pressure pipe 802 is coupled to the introduction pipe 804 at the time of current supply (ON). The introduction pipe 804 is further coupled to a three-port and three-position valve 805 which is a solenoid-operated valve arranged to take three positions in accordance with the value of the supplied current. The three ports thereof are coupled to the introduction pipe 804, a branch pipe 807 coupled to the rear-right wheel cylinder 109 and an introduction pipe 809 coupled to a reservoir 104. The three-.port and three-position valve 805 acts such that the introduction pipe 804 is coupled to the branch pipe 807 in response to de-energization, all the communications are cut off in the case of supply of a first predetermined current il, and the branch pipe 807 is coupled to the introduction pipe 809 in the case of supply of a second predetermined current i2. The introduction pipe 804 is also coupled to a three-port and three-position valve 806 which is similar in structure to the three-port and three-position valve 805. A branch pipe 808 is interposed between the three-port and three-position valve 806 and the rear-left wheel cylinder 111.

Figure 11:
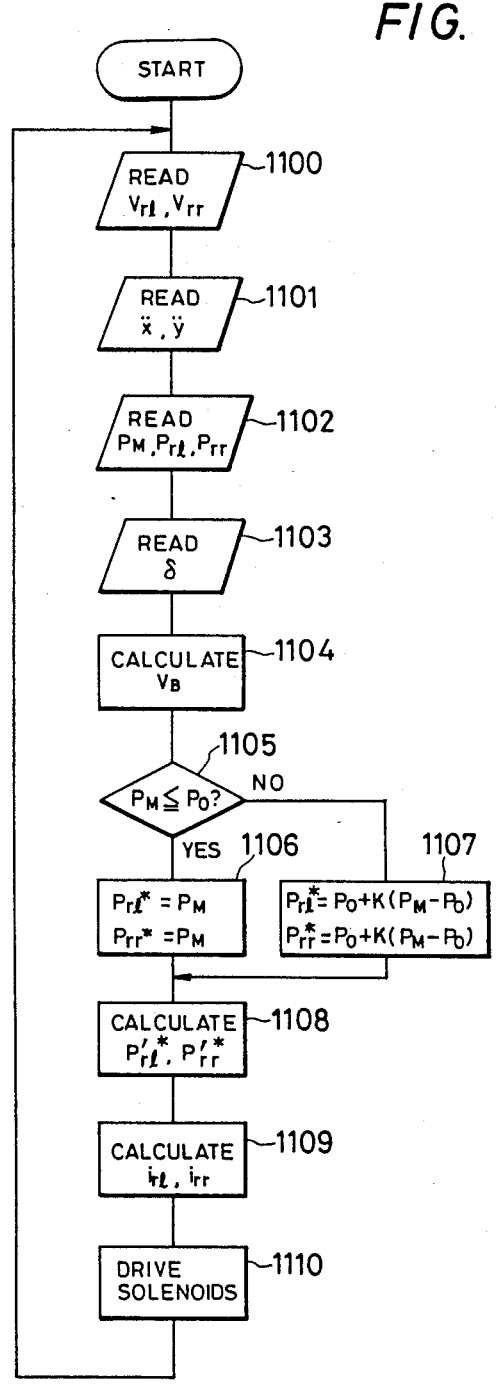
FIG. 11 is a flow chart showing the program provided for the third embodiment of this invention.

In this embodiment, braking force distribution control and proportioning valve funtion for rear-right and rear-left wheels 109, 111 are performed using the three-port and two position valve 803 and three-port and three-position valves 805 and 806. The operations will be described with reference to the flow chart of FIG. 11. Control starts with a step 1100 to read the wheel speeds Vrl and Vrr of the rear-left wheel 111 (RL) and the rear-right wheel 109 (RR). A subsequent step 1101 is executed to read the vehicle acceleration in the vehicle forward direction and the vehicle acceleration in a direction normal to the vehicle forward direction. A step 1102 is subsequently executed to read the hydraulic pressure $P_M$ in the master cylinder 103 and the hydraulic pressures Prl, Prr in the rear wheels RL, RR, followed by a step 1103 to read the steering angle δ.

In a step 1104, a vehicle speed $V_B$ is calculated on the basis of the wheel speeds Vrl, Vrr and the vehicle forwad acceleration. Control advances to a step 1105 in which the master cylinder hydraulic pressure $P_M$ is compared with a predetermined pressure value Po (for example, 25 kgf/cm$^2$). If PM≦Po, a step 1106 is executed so that the target braking hydraulic pressure for the rear wheels is set to be equal to the master cylinder hydraulic pressure $P_M$, before proceeding to a step 1108. On the other hand, if not in the step 1105, i.e., $P_M$>Po, a step 1107 is executed so as to determine the rear wheel target braking hydraulic pressure in accordance with the following equation (19).

$$Prl^* = Prr^* = Po + K \times (P_M - Po) \quad (19)$$

where K is a constant (K<1, for example, K=0.37).

According to this processes, when the master cylinder hydraulic pressure $P_M$ exceeds the predetermined pressure Po, the rear wheel cylinder hydraulic pressure becomes lower than the front wheel cylinder hydraulic pressure which is equal to the master cylinder hydraulic pressure $P_M$, resulting in obtaining the proportioning valve funtion.

Figure 8A:
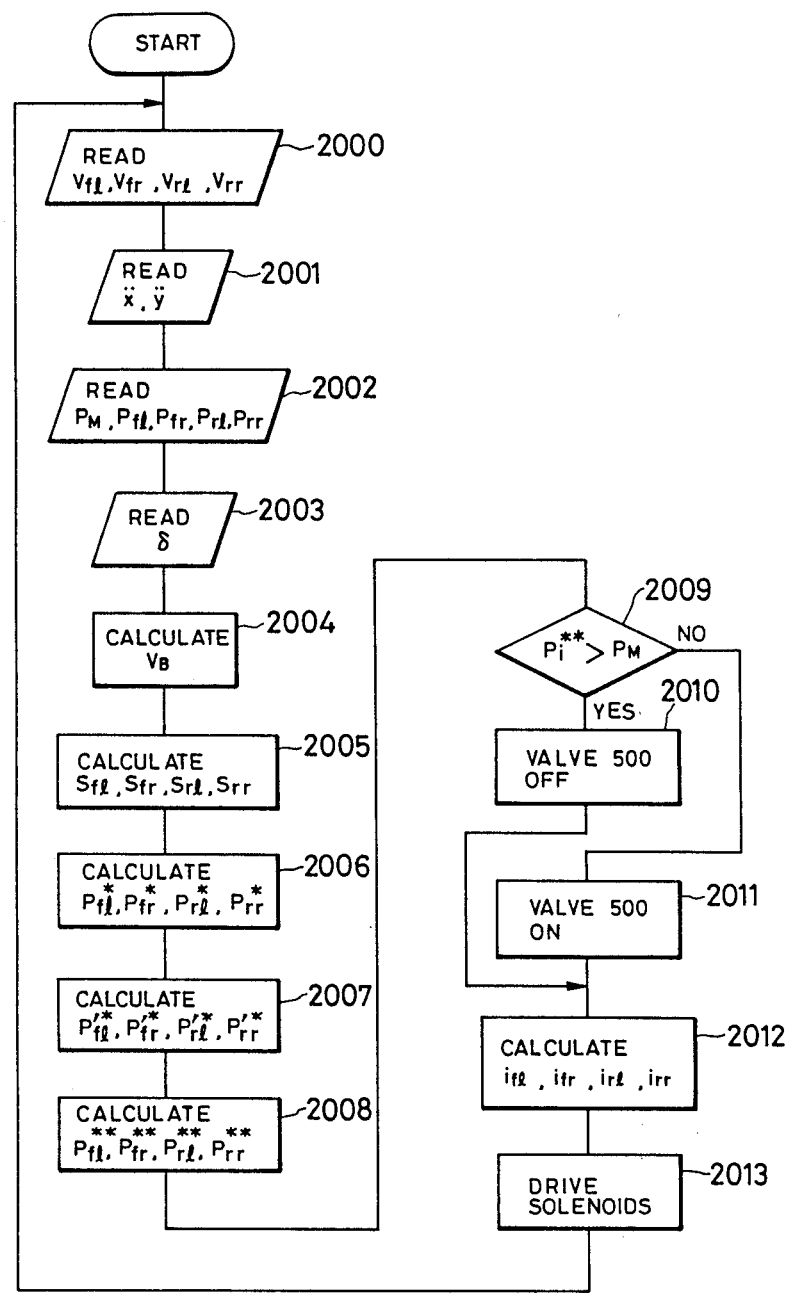
FIGS. 8A and 8B are flow charts showing the program provided for the second embodiment of this invention.
Figure 8B:
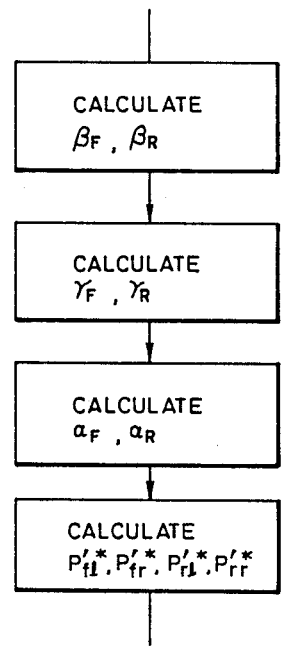
Figure 9:
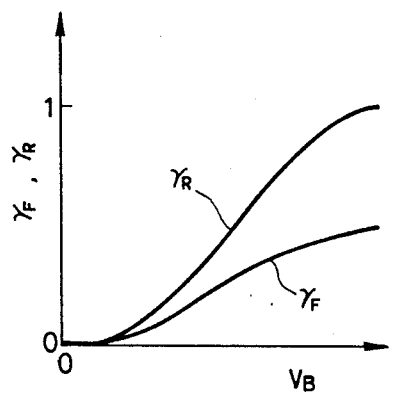
FIG. 9 is a graphic diagram showing the coefficient for obtaining the proper braking force movement rate with respect to the speed of the motor vehicle.

In the step 1108, the correction target braking hydraulic pressures P'rl*, P'rr* for the rear wheels are obtained as well as in the step 2007 of FIG. 8A, 8B. In a step 1109, the solenoid-operated valves 803, 805, 806 are controlled in accordance with the differences between the rear wheel braking hydraulic pressures in the step 1102 and the correction target braking hydraulic pressures in the step 1108. More specifically, in the hydraulic pressure correction, the three-port and two position valve 803 is first energized so that the the hydraulic pressure in the accumulator 113 is introduced to the three-port and three-position valves 805 and 806. Thereafter, the control currents to the valves 805 and 806 are determined in accordance with the comparisons between the wheel cylinder hydraulic pressures and the correction target braking hydraulic pressures. That is, for example, the control of the supply current to the three-port and three-position valve 109 is performed as follows.

$$irr = 0 \text{ when } Prr < P'rr^* \quad (20)$$

$$irr = i1 \text{ when } Prr \text{ is substantially equal to } P'rr^* \quad (21)$$

$$irr = i2 \text{ when } Prr > P'rr^* \quad (22)$$

where 0<i1<i2.

This means that, when the Prr is lower, it is increased by the hydraulic pressure in the accumulator 113 and when higher, it is decreased by flowing out to the reservoir 104 and when equal thereto, it is kept as it is.

After the termination of a step 1110 for driving the solenoids, the operational flow returns to the initial step 1100.

According to the second and third emboidments of this invention, since the braking force distribution for the left and right wheels can be properly performed in accordance with the vehicle state variations during the turning of the motor vehicle, it is possible to provide a smooth braking operation during the turning of the motor vehicle.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. A brake control system for use in a motor vehicle, comprising:

braking means including a master cylinder for generating a pressure in response to a depression of a braking pedal of said motor vehicle and applying the generated pressure through first and second braking passages to first and second wheel braking cylinders respectively associated with first and second wheels of said motor vehicle, said first braking passage being coupled to said first wheel braking cylinder and said second braking passage being coupled to said second wheel braking cylinder;

braking pressure source means for generating a hydraulic pressure independent of said braking means;

first and second pressure control means respectively coupled to said braking pressure source means for causing braking pressures to be generated therefrom and for allowing the braking pressures to be regulated independent of each other, said first pressure control means being coupled through said first braking to said first wheel braking cylinder and said second pressure control means being coupled through said second braking passage to said second wheel braking cylinder, said first and second pressure control means being responsive to the pressure from said master cylinder for respectively regulating braking pressures to said first and second wheel braking cylinders as an amount which is magnified by a predetermined amount as compared with the pressure from said master cylinder, by regulation of the pressure from said braking pressure source means;

first detection means for detecting a condition of each of said first and second wheels;

second detection means for detecting a running condition of said motor vehicle;

third detection means for detecting a pressure generated in said master cylinder;

fourth detection means for detecting a pressure applied to each of said first and second wheel braking cylinders;

target braking pressure setting means connected to said first to third detection means for determining first and second target braking pressures to said first and second wheel braking cylinders in accordance with the conditions of said first and second wheels detected by said first detection means, the running condition of said motor vehicle detected by said second detection means and the master cylinder pressure detected by said third detection means; and control means connected to said target braking pressure setting means for generating first and second control signals to said first and second pressure control means so that the hydraulic pressures in said first and second wheel braking cylinders detected by said fourth detection means are respectively equal to said first and second target braking pressures set in said target braking pressure setting means, said first and second control signals thereto controlling magnification ratios of the pressure from said master cylinder and the pressures to said first and second wheel braking cylinders.

2. A brake control system as claimed in claim 1, wherein said target braking pressure setting means includes means, determining each of said first and second target braking pressures to said first and second wheel braking cylinders, for:

(a) detecting wheel speeds of said first and second wheels by said first detection means;

(b) detecting an acceleration of said motor vehicle by said second detection means;

(c) detecting the master cylinder pressure by said third detection means;

(d) correcting the master cylinder pressure on the basis of the detected vehicle acceleration;

(e) calculating target pressures for said first and second wheel braking cylinders on the basis of the corrected master cylinder pressure;

(f) calculating a speed of said motor vehicle on the basis of the detected wheel speeds and the detected vehicle acceleration;

(g) calculating slip ratios of said first and second wheels on the basis of the calculated vehicle speed; and (h) correcting the calculated target pressures on the basis of the calculated slip ratios so as to obtain said first and second target braking pressures for said first and second wheel braking cylinders.

3. A brake control system for use in a motor vehicle, comprising:

braking means including a master cylinder for generating a pressure in response to depression of a braking pedal of said motor vehicle and applying the generated pressure through first and second braking passages to first and second wheel braking cylinders respectively associated with left and right wheels of said motor vehicle, said first braking passage being coupled to said first wheel braking cylinder and said second braking passage being coupled to said second wheel braking cylinder;

braking pressure source means for generating a hydraulic pressure independent of said braking means;

first and second pressure control means respectively coupled to said braking pressure source means for causing braking pressures to be generated and for allowing the braking pressures to be regulated independently of each other, said first pressure control means being coupled through said first braking passage to said first wheel braking cylinder, and said second pressure control means being coupled through said second braking passage to said second wheel braking cylinder, said first and second pressure control means being responsive to the pressure from said master cylinder for respectively regulating braking pressures to said first and second wheel braking cylinders as an amount which is magnified by a predetermined amount as compared with the pressure from said master cylinder by regulation of the pressure from said braking pressure source means;

first detection means for detecting a condition of each of said right and left wheels;

second detection means for detecting a running condition of said motor vehicle;

third detection means for detecting a pressure generated in said master cylinder;

fourth detection means for detecting a pressure applied to each of said first and second wheel braking cylinders;

fifth detection means for detecting a steering angle of a steering wheel of said motor vehicle;

target braking pressure setting means connected to said first to third and fifth detection means for determining first and second target braking pressures to said first and second wheel braking cylinders in accordance with the condition of said left and right wheels detected by said first detection means, the running condition of said motor vehicle detected by said second detection means, the master cylinder pressure detected by said third detection means and the steering angle detected by said fifth detection means so that, when said motor vehicle is turned, a braking pressure for the outside wheel with respect to the turning center is greater than a braking pressure for the inside wheel; and control means connected to said target braking pressure setting means for generating first and second control signals to said first and second pressure control means so that the hydraulic pressures in said first and second wheel braking cylinders detected by said fourth detection means are respectively equal to said first and second target braking pressures set in target braking pressure setting means, said first and second control signals thereto controlling the magnification ratios of the pressure from said master cylinder and the pressures to said first and second wheel braking cylinders.

4. A brake control system as claimed in claim 3, wherein said target braking pressure setting means includes means, determining each of said first and second target braking pressures to said first and second wheel braking cylinders for:
   (a) detecting wheel speeds of said first and second wheels by said first detection means;
   (b) detecting a first acceleration of said motor vehicle in a forward direction of said motor vehicle and a second acceleration in a direction normal to the vehicle forward direction by said second detection means;
   (c) detecting the master cylinder pressure by said third detection means;
   (d) detecting the steering angle by said fifth detection means;
   (e) calculating first and second target pressures for said first and second wheel braking cylinders on the basis of the detected master cylinder pressure;
   (f) calculating a speed of said motor vehicle on the basis of the detected wheel speeds and the detected first vehicle acceleration;
   (g) calculating slip ratios of said left and right wheels on the basis of the calculated vehicle speed;
   (h) calculating a braking force movement rate on the basis of the turning state of said motor vehicle;
   (i) correcting the calculated first and second target pressures on the basis of the calculated braking force movement rate; and
   (j) further correcting the corrected first and second target pressures on the basis of the calculated slip ratios so as to obtain said first and second target braking pressures for said first and second wheel braking cylinders.

5. A brake control system as claimed in claim 4, wherein the correction in the step (j) is inhibited when the detected steering angle is smaller than a predetermined value.

6. A brake control system as claimed in claim 4, wherein said braking force movement rate is obtained on the basis of a load movement rate derived from the detected steering angle, the detected second vehicle acceleration and the calculated vehicle speed.

7. A brake control system as claimed in claim 6, wherein said load movement rate is corrected by a predetermined value which is determined as a function of the detected vehicle speed 8. A brake control system as claimed in claim 4, wherein the first and second target pressures in the step (e) are set to be equal to the detected master cylinder pressure when the detected master cylinder pressure is lower than a predetermined pressure value and set to a value smaller than the detected master cylinder pressure when the detected master cylinder pressure is higher than the predetermined pressure value.

9. A braking control system as claimed in claim 1, further comprising wheel speed sensor means for sensing a speed of each of said first and second wheels, decision means for determining a wheel locking state on the basis of a signal indicative of the sensed wheel speed from said wheel sensor means, cut valve means for cutting off the communication between said master cylinder and the corresponding wheel braking cylinder in response to the determination of said decision means, and pressure-regulating cut valve means arranged to open so as to decrease the pressure in the corresponding wheel braking cylinder in response to the determination of said decision means.

10. A brake control system as claimed in claim 1, further comprising wheel speed sensor means for sensing a speed of each of said first and second wheels, correction means for correcting each of said first and second target braking pressures, comprising means for comparing each of the corrected first and second target braking pressures with the master cylinder pressure, and means for cutting off the communication between said master cylinder and the corresponding wheel braking cylinder.

* * * * *